US009311384B1

(12) United States Patent
Jain et al.

(10) Patent No.: US 9,311,384 B1
(45) Date of Patent: Apr. 12, 2016

(54) PROVIDING RECOMMENDATIONS

(71) Applicant: Google Inc., Mountain View, CA (US)

(72) Inventors: Ankit Jain, Milpitas, CA (US); Wei Chai, Union City, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/788,251

(22) Filed: Mar. 7, 2013

(51) Int. Cl.
*G06F 17/30* (2006.01)
(52) U.S. Cl.
CPC ............... *G06F 17/30595* (2013.01)
(58) Field of Classification Search
CPC ............ G06F 17/30867; G06F 17/30424; G06F 17/30386; G06F 17/30483; G06F 17/30551; G06F 17/30755
USPC .......... 705/26.62, 14.66, 14.53, 14.73, 14.45, 705/26.5, 26.7, 14.32, 14.41, 14.44, 14.49, 705/14.54, 14.57, 14.58, 14.68, 14.72, 2, 705/26.1, 26.63, 3, 36 R, 39, 41, 44, 7.26, 705/7.36, 7.42; 707/736, 723, 732, 737, 707/754, 725, 727, 758, 767, 769, 776, 793, 707/821, 748; 715/234, 202, 205, 217, 751, 715/753, 758, 765, 769; 725/46, 75
See application file for complete search history.

(56) References Cited

U.S. PATENT DOCUMENTS

| 8,260,117 | B1 | 9/2012 | Xu et al. | |
| 8,489,515 | B2 * | 7/2013 | Mathur | 705/319 |
| 8,732,853 | B1 * | 5/2014 | Byrne | H04L 63/0838 713/183 |
| 2005/0033657 | A1 * | 2/2005 | Herrington et al. | 705/26 |
| 2006/0271548 | A1 * | 11/2006 | Maes | 707/10 |
| 2009/0018898 | A1 | 1/2009 | Genen | |
| 2009/0248599 | A1 | 10/2009 | Hueter et al. | |
| 2010/0235394 | A1 * | 9/2010 | Sukanen | G06F 17/3087 707/782 |
| 2012/0158514 | A1 | 6/2012 | Aldrey et al. | |

FOREIGN PATENT DOCUMENTS

| EP | 2109078 A1 | 10/2009 |
| EP | 2395467 A1 | 12/2011 |
| WO | 03098932 A1 | 11/2003 |

OTHER PUBLICATIONS

International Search Report and Written Opinion of PCT/US3025/021492 mailed Jul. 7, 2014.

* cited by examiner

*Primary Examiner* — Jay Morrison
*Assistant Examiner* — Ken Hoang
(74) *Attorney, Agent, or Firm* — Morris & Kamlay LLP

(57) ABSTRACT

A server system, which manages distribution or download of content, may obtain data relating to interactions between a user and one or more other server systems providing services that are different from services provided by the server system. The server system may then analyze the obtained interactions related data, with the analysis comprising identifying content accessed, obtained, or used by the user during the interactions between the user and the one or more other server systems. The server system may then map that content to one or more other contents available in the server system, and may generate, based on that mapping, recommendation information personalized for the user.

21 Claims, 4 Drawing Sheets

PROVIDING RECOMMENDATIONS

TECHNICAL FIELD

Aspects of the present application relate to distribution of content. More specifically, certain implementations of the present disclosure relate to detecting and utilizing user content preferences and use history to provide high-quality recommendations.

BACKGROUND

Various types of electronic devices are commonly used nowadays. In this regard, electronic devices may be used by one or more users, for various purposes, including both personal and commercial. Electronic devices may be mobile or non-mobile, may support communication (wired and/or wireless), and/or may be general or special purpose devices. Examples of electronic devices comprise handheld mobile devices (e.g., cellular phones, smartphones, and/or tablets), computers (e.g., laptops, desktops, and/or servers), and/or other similar devices. In some instances, electronic devices may be used in accessing and/or using content. For example, content may comprise applications, including applications intended for recreational use (e.g., games) and applications intended for personal or business use (e.g., shopping, purchases, banking, scheduling, navigation, and the like); multimedia content (e.g., music, movies, TV shows, and the like); and/or electronic documents (e.g., online articles, e-books, and the like). Content used in or accessed by electronic device may be obtained online.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for detecting and utilizing user content preferences and use history provide high quality recommendations, substantially as shown in and/ or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Figure 1:
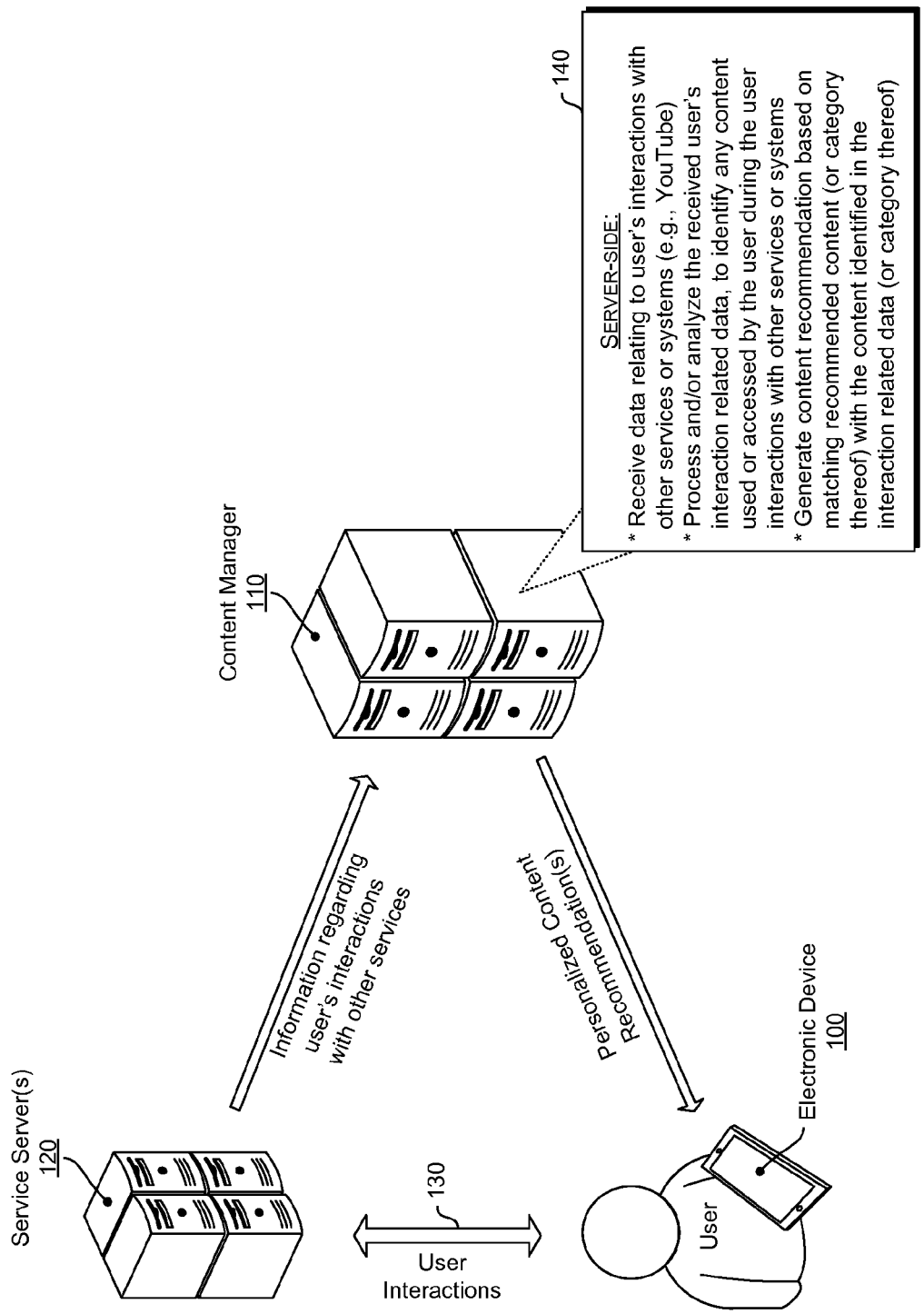
FIG. 1 is a block diagram illustrating an example of interactions between a user and a plurality of servers to support providing enhanced content recommendations based on user interactions.

The present disclosure relates to a method and system for detecting and utilizing user content preferences and use history to provide high-quality recommendations. In various implementations, a server system that manages distribution of content may be configured to provide high quality recommendations based on user content preferences and/or use history. In this regard, the server system may obtain interactions related data, relating to interactions of a user, who may be associated with the server system, when obtaining services different from services provided by the server system. The server system may then analyze the interactions related data, wherein the analyzing may comprise identifying a first content associated with the interactions for the services different from services provided by the server system, and may map the first content to a second content offered by the server system. The server system may then generate recommendation information personalized for the user based on the mapping of the first content to the second content. The interactions of the user when obtaining services different from services provided by the server system may comprise viewing, sampling, and/or searching for at least a portion of the first content. The server system may map the first content to the second content based on matching of the first content or a category corresponding to the first content with the second content or a category corresponding to the second content. In this regard, the server system may match the first content or a category corresponding to the first content with the second content or a category corresponding to the second content based on one or more matching thresholds. The server system may map the first content to the second content based on correlating attributes associated with the first content or a category corresponding to the first content to attributes associated with the second content or a category corresponding to the second content. The server system may map the first content to the second content based on one or more of: title parsing, metadata matching, or content fingerprinting.

In some instances, the server system may maintain a user database corresponding to a plurality of users associated with the server system and/or services offered through the server system. In this regard, the server system may update the user database based on the interactions related data. For example, the server system may generate an entry in the user database corresponding to the user accessing the first content responsive to determining, during the updating of the user database, that it lacks an entry for the user. The server system may modify or adjust an entry in the user database corresponding to the user accessing the first content responsive to determining, during the updating of the user database, that it comprises an entry for the user.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduces a list of one or more non-limiting examples, instances, or illustrations.

FIG. 1 is a block diagram illustrating an example of interactions between a user and a plurality of servers to support providing enhanced content recommendations based on user interactions. Referring to FIG. 1 there is shown an electronic device 100, a content management server 110, and a secondary service server 120.

The electronic device 100 may comprise suitable circuitry, interfaces, logic, and/or code for performing, executing or running various operations, functions, applications and/or services. In this regard, the electronic device 100 may perform, execute and/or run operations, functions, applications and/or services based on user instructions and/or pre-configured instructions. Thus, the electronic device 100 may be configured to support or enable (e.g., by use of suitable input/output devices or components) interactions with users, such as to obtain user input and/or to provide user output. In some instances, the electronic device 100 may support communication of data, such as via wired and/or wireless connections, in accordance with one or more supported wireless and/or wired protocols or standards. In some instances, the electronic device 100 may be a handheld mobile device—i.e. intended for use on the move and/or at different locations. In this regard, the electronic device 100 may be designed and/or configured to allow for ease of movement, such as to allow it to be readily moved while being held by the user as the user moves, and the electronic device 100 may be configured to perform at least some of the operations, functions, applications and/or services supported by the device on the move. Examples of electronic devices may comprise handheld devices (e.g., cellular phones, smartphones, and/or tablets), computers (e.g., laptops or desktops), servers, dedicated multimedia devices (e.g., game consoles and portable media players), and/or other similar devices. The disclosure, however, is not limited to any particular type of electronic device.

The content management server 110 may comprise suitable circuitry, interfaces, logic, and/or code for centrally managing content (e.g., games and/or other applications, multimedia content, e-books and other online publications, etc.) that may be made available (e.g., for download and/or distribution) to electronic devices, such as the device 100. In this regard, the content management server 110 may be associated with an entity offering content for download (free or by-purchase) to the electronic device 100. Such entities may comprise physical entities and/or logical entities. Examples of entities offering content for download may comprise online stores, content or service providers, and the like. The disclosure, however, is not limited to any particular type of content offering entity. The content management server 110 may comprise a dedicated processing system or general-purpose system (e.g., a dedicated server or a PC), which may be configured for use as centralized content manager (e.g., programmed to provide the application management functions described in this disclosure). In some instances, a content manager 'server' may actually comprise a plurality of machines, at least some of which may be installed in different locations, and each of which may be utilized to implement distinct or redundant functions associated with application management operations as described in the present disclosure.

The secondary service server 120 may comprise suitable circuitry, interfaces, logic, and/or code for providing services (including content related services), which are distinct and/or different from the services provided by the content management server 110. For example, the secondary service server 120 may be configured to only provide or allow real-time access and/or sampling of content (or portions thereof). In other words, while content (or portions of content) may be sampled (e.g., viewed, heard, or read), the secondary service server 120 may not allow obtaining content (e.g., not enable download and storage of content), by electronic devices, such as to facilitate repeated and/or subsequent use of the content. The secondary service server 120 may comprise a dedicated processing system or general-purpose system (e.g., a dedicated server or a PC), which may be configured for use as a centralized content manager (e.g., programmed to provide the application management functions described in this disclosure). In some instances, a secondary service 'server' may actually comprise a plurality of machines, at least some of which may be installed in different locations, and each of which may be utilized to implement distinct or redundant functions associated with application management operations as described in the present disclosure.

In operation, electronic devices, such as the electronic device 100, may be operable to utilize or access various types of content that may be available to and/or accessible by the electronic devices. Examples of content may comprise applications, including both recreational applications (e.g., games) and applications intended for personal or business/commercial use (e.g., shopping, purchases, banking, scheduling, navigation, and the like); multimedia content (e.g., music, movies, TV shows, video clips, and the like); and/or electronic documents (e.g., online articles or publications, e-books, and the like). The disclosure is not limited to any particular type of content, however. Content used in electronic devices (e.g., the electronic device 100) may be pre-installed. In some instances, however, content may be obtained and/or installed (e.g., by action of device users). In this regard, content may be distributed to (or downloaded by) electronic devices (e.g., the electronic device 100), or simply accessed by the devices. For example, the electronic device 100 may be configured to allow use of Internet connections (e.g., over wired or wireless links) to access content (i.e. dynamically and/or in real-time), and/or to download and install content in the electronic device 100 (e.g., for present and future use). In this regard, content may be offered for distribution (for free or by-purchase) by centralized content distributors (e.g., online stores, content or service providers, and similar entities), using content distribution systems or platforms (e.g., the content manager 110).

In some instances, such centralized content distribution systems or platforms may offer content by means or advertisements or recommendations (e.g., developed using content recommendation systems or engines), which may be directed to particular devices and/or users. The advertised or recommended content may comprise, for example, new content previously not available, or existing content (i.e., currently available) which may not be presently available or used (e.g., download into and/or stored or installed) in the end-point devices. In some instances, generating the content advertisements or recommendations may be based on some information pertaining to the end-point devices and/or users. For example, in configuring or modifying content advertisements or recommendations, centralized content distribution systems or platforms may rely on information relating to the user (e.g., present location, etc.), and/or information relating to prior content-related interactions by the user with the centralized content distribution systems or platforms—e.g., prior content history (i.e., previous transactions, such as content previously purchased and/or downloaded). Such approach, however, may not yield optimal results because there may not be sufficient prior content related information with respect to some users. In this regard, the main limitation of such (legacy) systems, however, is that they may depend heavily on the users' prior history (i.e., on users' previously using the system and conducting transactions on or with the systems), which may not be useful when there may be no prior history or a very limited one, and/or where prior history may result in excluding content that the users would have been interested in even though there were no prior content interactions that would indicate or suggest that.

Accordingly, in various implementations of the present disclosure, information related to user activities (other than with the centralized content distribution systems or platforms—e.g., the content manager 110) may be utilized to enhance content recommendations, such as by optimizing user content preferences and/or content matching. In this regard, limitations resulting from no or limited prior history may be mitigated, such as by utilizing various means for generating recommendations for a particular system/service based on user interactions with particular, other systems/services. For example, a content advertisement and/or recommendation may be configured to piggy-back on data obtained by or maintained on other systems (and/or for other services), and to use that data in meaningful ways to improve the quality content recommendations; particularly for music, TV show and movie recommendations since these areas may typically have weak usage data associated with them (e.g., due to the abundance of activities that may skew reliability of the data, such as bootlegging and/or lack of sales in the digital arena).

In an example implementation, the content manager 110 may be configured to implement an optimized content recommendation scheme 140. In this regard, the content manager 110 may obtain information relating to user interactions 130 with other services (e.g., via the secondary service server 120), which, while it may not be capable of offering content for distribution and/or purchase, may still enable users to have limited content related interactions. For example, the other services may comprise particular websites that may allow users to view (e.g., sample) particular types of content (e.g., songs, music videos, movie trailers, clip of a TV show) in a limited manner (e.g., allowing only viewing portions/samples of the content, or not allowing download/distribution of content to users' electronic device, such that to allow viewing it again—i.e., only real-time sampling). The use of user interactions related information may be configured to ensure user privacy and/or anonymity, and/or to allow user control of the use of that information. For example, opt-in/opt-out options (e.g., using suitable interactive interfaces) may be supported and/or incorporated, to allow users to allow/prevent use of information relating to their interactions. Furthermore, even when users may allow (e.g., by opting-in) use of user interaction related information, extra measures for ensuring privacy may be supported and/or incorporated, such as to enable anonymization of the users (e.g., allow use of numerical and/or random identifiers rather than users' names or user related data).

The content manager 110 may analyze the information obtained from the other services, to enable enhancing content related services provided by the content manager 110. For example, the content manager 110 may utilize the users' content information (e.g., viewing/sampling data) obtained from the other services to identify content (e.g., music, TV, movies, documents) available for distribution or purchase via content manager 110. In this regard, the identified content (available in the content manager 110) may correspond to the same content (e.g., full copies of the content that the users view samples of portions of via the other services), and/or other content—e.g., different yet sufficiently related/similar content, which may be determined as such based on defined matching criteria and/or (dis)similarity thresholds. The content manager 110 may also utilize the users' content information obtained from the other services to generate, update, and/or optimize user specific content knowledge (e.g., users content preferences), such as to enable generating personalized recommendation and/or search results.

For example, the content manager 110 may receive information indicating that the user (using electronic device 100) had viewed a sample/portion of particular multimedia content (e.g., a music video) on a particular online streaming website. The content manager 100 may then analyze that information, such as using a set of defined heuristics, to determine a match between the viewed/sampled multimedia content and content that is available for distribution via the content manager 110. The defined heuristics may comprise, for example, title parsing (i.e. being able to parse through content title descriptions—e.g., being able to understand descriptors such as "music video", "trailer", "clip", "funny scene from", and the like—in order to link part or whole of a viewed/sampled content with a plurality of content offered via the content manager 110); metadata matching (i.e., identify, compare, and/or match information in metadata associated with various content); and/or content fingerprinting (e.g., utilizing audio fingerprinting, such as for music, to enable matching audio content viewed or sampled with audio content offered by the content manager 110). In some instances, identified mappings/matches (if any) between the viewed/sampled content and available content may be stored/maintained by the content manager 110. Identified mappings/matches may be utilized, either dynamically (i.e., in real-time or near real-time) or subsequently, in generating personalized recommendations for users. In this regard, the content manager 110 may request from the service server 120, content viewing information (e.g., watching/listening history of particular user(s)) and determine, based on mapping/matching of viewed/sampled content with available content, whether there may be any content available in the content manager 110 that had been obtained or purchased by the users from the content manager 110. Any such content may be recommended to the user(s).

Figure 2:
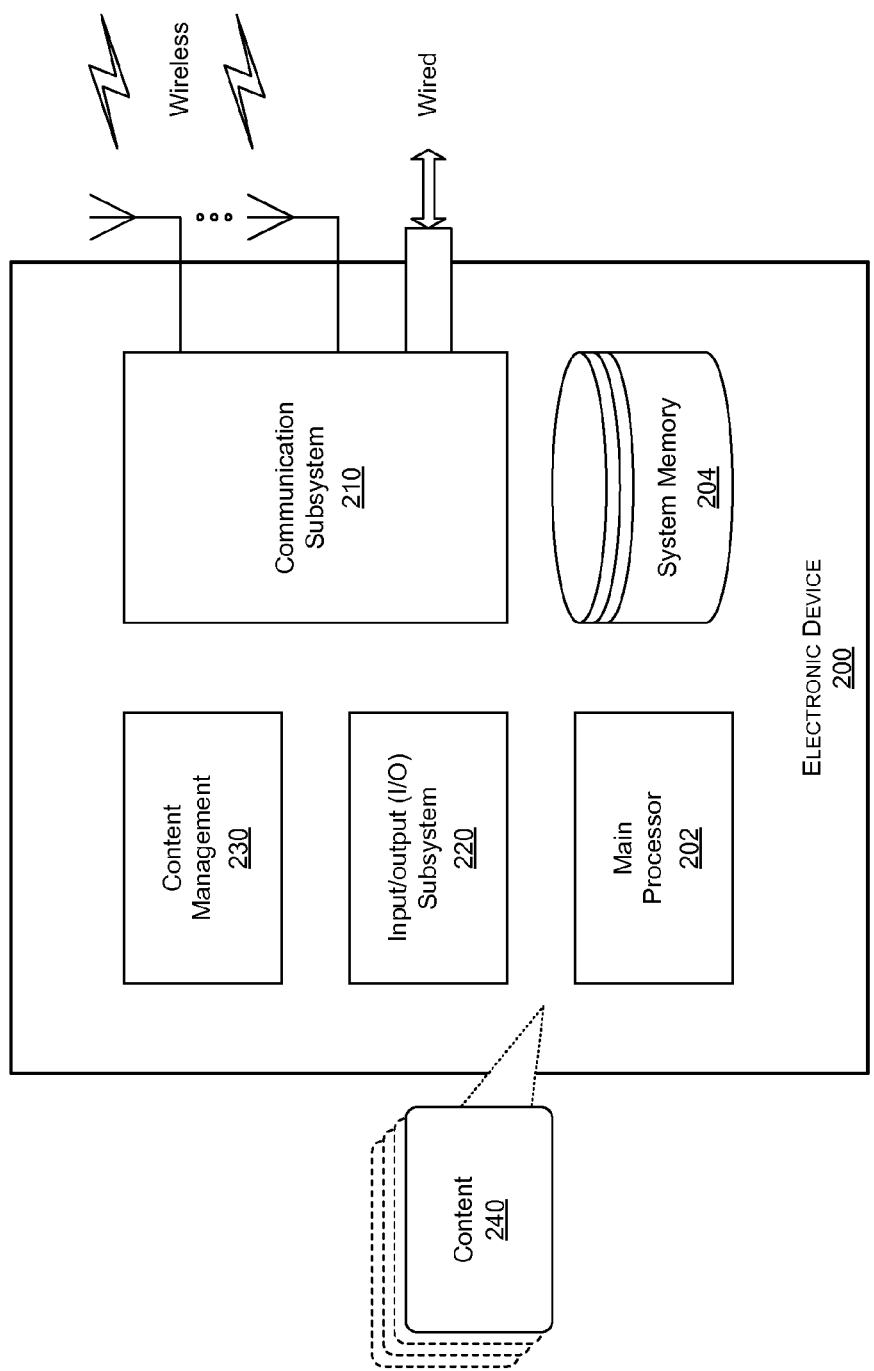
FIG. 2 is a block diagram illustrating an example electronic device that may support use of enhanced content recommendations based on user interactions.

FIG. 2 is a block diagram illustrating an example electronic device that may support use of enhanced content recommendations based on user interactions. Referring to FIG. 2 there is shown an electronic device 200.

The electronic device 200 may comprise suitable circuitry, interfaces, logic, and/or code for implementing various aspects of the disclosure. In this regard, the electronic device 200 may correspond to, for example, the electronic device 100 of FIG. 1. The electronic device 200 may comprise, for example, a main processor 202, a system memory 204, a communication subsystem 210, an input/output (I/O) subsystem 220, and a content manager 230.

The main processor 202 may comprise suitable circuitry, interfaces, logic, and/or code that may be operable to process data, and/or control and/or manage operations of the electronic device 200, and/or tasks and/or applications performed therein. In this regard, the main processor 202 may configure and/or control operations of various components and/or subsystems of the electronic device 200, by utilizing, for example, one or more control signals. The main processor 202 may enable running and/or execution of applications, programs and/or code, which may be stored, for example, in the system memory 204. Alternatively, one or more dedicated application processors may be utilized for running and/or executing applications (or programs) in the electronic device 200.

The system memory 204 may comprise suitable circuitry, interfaces, logic, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The communication subsystem 210 may comprise suitable circuitry, interfaces, logic, and/or code operable to communicate data from and/or to the electronic device, such as via one or more wired and/or wireless connections. The communication subsystem 210 may be configured to support one or more wired protocols and/or interfaces, and/or one or more wireless protocols and/or interfaces, facilitating transmission and/or reception of signals to and/or from the electronic device 200 and/or processing of transmitted or received signals in accordance with applicable wired or wireless protocols. Examples of wireless protocols or standards that may be supported and/or used by the communication subsystem 210 comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB), and/or the like. Examples of wired protocols and/or interfaces that may be supported and/or used by the communication subsystem 210 comprise Ethernet (IEEE 802.2), Fiber Distributed Data Interface (FDDI), Integrated Services Digital Network (ISDN), and Universal Serial Bus (USB) based interfaces. Examples of signal processing operations that may be performed by the communication subsystem 210 comprise, for example, filtering, amplification, analog-to-digital conversion and/or digital-to-analog conversion, up-conversion/down-conversion of baseband signals, encoding/decoding, encryption/decryption, and/or modulation/demodulation.

The I/O subsystem 220 may comprise suitable circuitry, interfaces, logic, and/or code for enabling and/or managing user interactions with the electronic device 200, such as obtaining input from, and/or to providing output to, the device user(s). The I/O subsystem 220 may support various types of inputs and/or outputs, including, for example, video, audio, and/or text. In this regard, dedicated I/O devices and/or components, external to (and coupled with) or integrated within the electronic device 200, may be utilized for inputting and/or outputting data during operations of the I/O subsystem 220. Examples of such dedicated I/O devices may comprise displays, audio I/O components (e.g., speakers and/or microphones), mice, keyboards, touch screens (or touchpads), and the like. In some instances, user input obtained via the I/O subsystem 220, may be used to configure and/or modify various functions of particular components or subsystems of the electronic device 200.

The content manager 230 may comprise suitable circuitry, interfaces, logic, and/or code for managing content and/or content related information in the electronic device 200. In this regard, the content manager 230 may control and/or manage a plurality of content 240 and/or various operations or functions relating thereto (e.g., creation, obtainment, distribution, sharing, storage, use, etc.). In some instances, the content manager 230 may be configured to support handling content recommendations that may be sent to the electronic device 200. In this regard, the content manager 230 may process received content recommendation, and may determine whether (or not) to obtain any recommended content.

In operation, the electronic device 200 may be utilized (e.g., by the device user) during use or consumption of content (e.g., the content 240). For example, a device user may utilize the electronic device 200 to, via the I/O subsystem 220 for example, listen to audio content, view video content, utilize applications, play games, read online articles or e-book, and the like. In some instances, some of the content 240 may be pre-installed on the electronic device 200. In other instances, however, at least some content may be accessed using the electronic device and/or may be obtained. In this regard, when accessing content (e.g., to sample or view portions of content), the electronic device 200 may be used to setup connections (e.g., an Internet connection, over wired and/or wireless links established using the communication subsystem 210) to suitable services sources (e.g., a website), which may then be used to sample content in limited manner (e.g., only real-time sampling, without ability to obtain local copies that may be stored and used repeatedly and/or subsequently). On the other hand, in some instances the electronic device 200 may be used to obtain authorized copies of particular content. For example, the electronic device 200 may be obtain via suitable (e.g., Internet) connections copies of content from content distributors (e.g., the content management server 110). The obtained content may be stored (e.g., locally in the electronic device, such as in the system memory 204), allowing the device user to utilize content thereafter (repeatedly and/or in desirable conditions—e.g., time, place, etc.)

In some instances, the electronic device 200 may be configured to participate in and/or support use of content recommendations. In this regard, rather than simply having the selection of content (to be requested) be solely driven by users' autonomous determinations, content distributors may communicate to users (via their electronic devices) content recommendations or advertisements. For example, the electronic device 200 may receive from content distributors (e.g., the content management server 110) messages listing content that may recommended by the content distributors. In this regard, the content recommendations may be prepared broadly (i.e. mass recommendation). In some instances, however, the content recommendations may be configured specifically for particular user(s). For example, content distributors may configure personalized content recommendations based on prior content use (e.g., previous downloads from or requests to the content distributor(s) by the user(s)). In an example implementation of the disclosure, the electronic device 200 may support participation in an enhanced content recommendation scheme, as described with respect to FIG. 1. In this regard, the content distributor may generate enhanced, personalized content recommendations for a user of the electronic device 200 based on interactions by the user during services provided by other entities. For example, the device user may utilize the electronic device 200 to sample content that may only be accessed dynamically without being able to actually obtain the content (e.g., view content from a website). The content distributor may obtain information relating to user interactions in the course of receiving the other services, and may use that information to enhance selection of recommended content (e.g., based on matching with sampled content) and/or to obtain better knowledge about user preferences.

Figure 3:
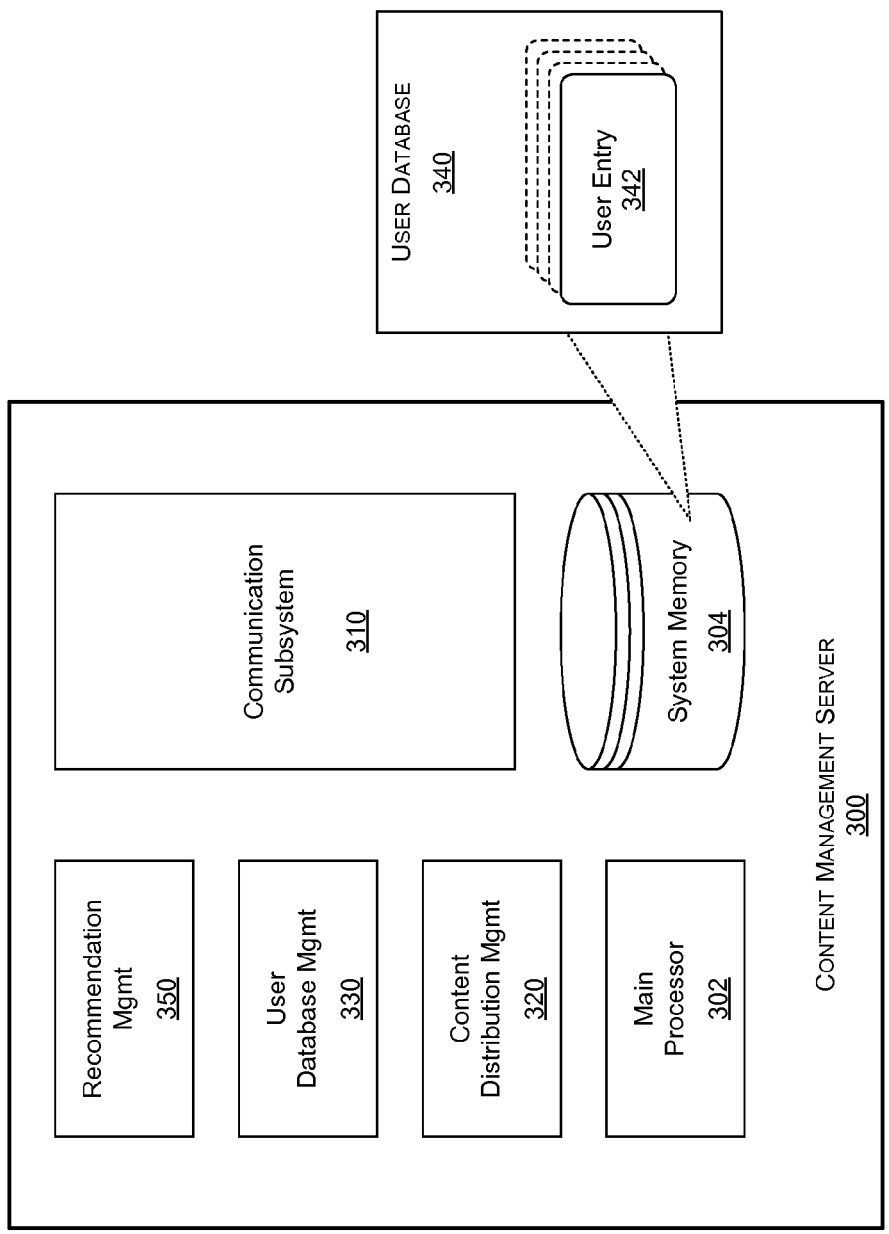
FIG. 3 is a block diagram illustrating an example content management server that may support enhanced content recommendations based on user interactions.

FIG. 3 is a block diagram illustrating an example content management server that may support enhanced content recommendations based on user interactions. Referring to FIG. 3 there is shown a content management server 300.

The content management server 300 may comprise suitable circuitry, interfaces, logic, and/or code operable to implement various aspects of the disclosure. In this regard, the content management server 300 may correspond to, for example, the application management server 110 of FIG. 1.

The content management server 300 may comprise, for example, a main processor 302, a system memory 304, a communication subsystem 310, a content distribution management module 320, a user database management module 330, and a recommendation management module 350.

The main processor 302 may comprise suitable circuitry, interfaces, logic, and/or code that may be operable to process data, and/or control and/or manage components, operations or functions of the content management server 300, and/or tasks performed therein. In this regard, the main processor 302 may configure and/or control operations of various components and/or subsystems of the content management server 300, by utilizing, for example, one or more control signals.

The system memory 304 may comprise suitable circuitry, interfaces, logic, and/or code that may enable permanent and/or non-permanent storage, buffering, and/or fetching of data, code and/or other information, which may be used, consumed, and/or processed. In this regard, the system memory 304 may comprise different memory technologies, including, for example, read-only memory (ROM), random access memory (RAM), Flash memory, solid-state drive (SSD), and/or field-programmable gate array (FPGA). The system memory 304 may store, for example, configuration data, which may comprise parameters and/or code, comprising software and/or firmware.

The communication subsystem 310 may be substantially similar to the communication subsystem 210 of FIG. 2 for example. In this regard, the communication subsystem 310 may comprise suitable circuitry, interfaces, logic, and/or code for enabling communicate data or messages from and/or to the content management server 300, via wired and/or wireless connections for example.

The content distribution management module 320 may comprise suitable circuitry, interfaces, logic, and/or code for managing and/or controlling content distribution via the content management server 300. For example, the content distribution management module 320 may be configured to process content requests received from client devices, manage establishing connections with client devices that may be used in distributing requested content, and/or may be configured to perform necessary device/user authentication.

The user database management module 330 may comprise suitable circuitry, interfaces, logic, and/or code for managing, controlling, and/or using an user database 340, which may be maintained in the content management server 300 (e.g., in a partition of the system memory 304). In this regard, the user database 340 may comprise information corresponding to plurality of users that may be serviced by the content management server 300—e.g., use the content management server 300 to obtain content that may be download and/or stored on client devices associated with the users. The user database 340 may comprise, for example, a plurality of entries 342, each corresponding to a particular user, with each entry comprising information pertinent to the associated user. The user information may comprise, for example, information associated with the user (identification and/or access related information), information relating to known client device(s) that may be utilized by the user in interacting with the content management server 300, and/or preferences (e.g., defined or determined) associated with the user (particular preferences relating to content).

The recommendation management module 350 may comprise suitable circuitry, interfaces, logic, and/or code for managing and/or controlling content recommendations in the content management server 300. For example, the recommendation management module 350 may be configured to generate content recommendations or advertisements directed to particular users and/or client devices serviced by the content management server 300. In some instances, the recommendation management module 350 may be configured to generate and/or adjust content recommendations or advertisements based on information received from external entities (e.g., from users, client devices utilized by the users, and/or other systems/servers with which the user may interact). The recommendation management module 350 may process that information, such as to enable optimizing selection of content that may be recommended or advertised to particular users. For example, in an example implementation in accordance with the present disclosure, user interactions with other servers/services may enable identifying content that correspond to content sampled or viewed by users using other entities, and/or to generation (or modify, if it already exist) user preferences.

In operation, the content management server 300 may generate optimized content recommendation(s) or advertisement(s), which may be specifically tailored for particular user(s). In this regard, the content recommendation(s) or advertisement(s) may be optimized based on user interactions with other entities. For example, the content management server 300 may receive, such as via the communication subsystem 310, from other entities (e.g., secondary service server 120) content specific information relating to user interactions with the other entities. In this regard, the content specific information may describe or identify, for example, content that user may have sampled or accessed in the course of the interactions with the other entities. For example, the other entities may comprise a website that may be used to sample portions of audio content (e.g., songs), video content (e.g., TV shows or movies), or textual content (e.g., online articles).

In some instances, the content management server 300 may utilize the obtained interaction related information to generate and/or update user related information. For example, the content management server 300 may process and/or analyze (e.g., via the user database management module 330) the obtained information to determine or identify any data pertaining to user preferences, particularly relating to content. The determined and/or identify data may then be used (e.g., by the user database management module 330) to update the user database 340—e.g., updating appropriate user database entries 342. For example, in instances where a user database entry 342 associated with the corresponding user may already exist, that entry may be updated as necessary based on the newly obtained user interaction related information (e.g., the obtained information may be used to modify and/or adjust the existing entry, if feasible). Otherwise, a new user database entry 342 may be created in the user database 340, and may be populated (as much as possible) using the obtained user interaction related information.

The content management server 300 may process and/or analyze (e.g., via the recommendation management module 350) the obtained information, to enable identifying and/or selecting available or offered content that may be recommended and/or advertised, and which would likely be desired by the corresponding user(s). In this regard, various criteria and/or parameters may be used identifying or selecting the would-be-recommended content. For example, in some instances, the selection may be based on an exact match—e.g., the selected content is the same content the user accessed or sampled a portion of during interactions with the other entities. In other instances, however, the selection of the would-be-recommended content may be configured to allow for other than exact matches—i.e., may allow for selecting content that may not be an exact match. In this regard, the content search and selection process may be configured to allow for identifying and selecting non-exact-match content so long as would-be-recommended content matched particular criteria or thresholds. For example, the content search and selection process may allow for selecting content that may be in the same category or of the same type (e.g., songs in the same genre or articles in the same topic/issue), content that at least share some commonality with the sampled/accessed content (e.g., in authorship, artists or actors, without requiring exact match), and the like. Furthermore, in some instances, one or more matching thresholds may be defined and/or used in the content search and selection process. For example, the content search and selection process may be configured to require a particular minimum commonality threshold (e.g., three actors in TV shows or movies) for possible match.

Once the best candidate content available or offered via the content management server 300 is identified, based on the newly obtained user interaction related information, corresponding (optimized) content recommendation(s) or advertisement(s) may be generated by the recommendation management module 350, and the content recommendation(s) or advertisement(s) may be communicated by the content management server 300 (e.g., using the communication subsystem 310) to client device(s) associated with the corresponding user.

Figure 4:
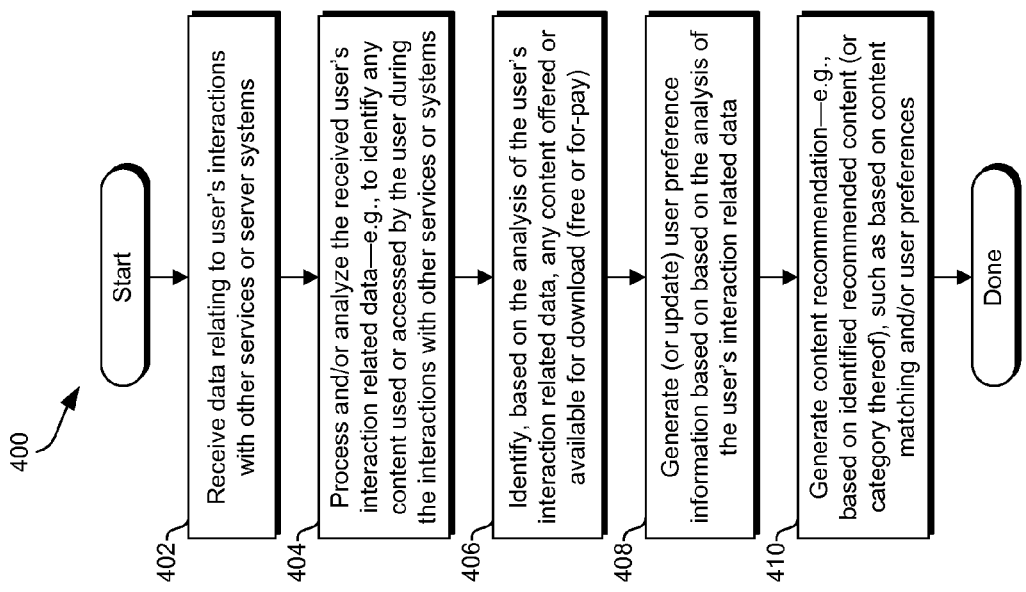
FIG. 4 is a flow chart that illustrates an example process for generating enhanced content recommendation based on user interactions.

FIG. 4 is a flow chart that illustrates an example process for generating enhanced content recommendations based on user interactions. Referring to FIG. 4, there is shown a flow chart 400 comprising a plurality of example steps for generating content recommendations, which may be optimized based on particular user interactions with secondary services (or server providing these services) that are different than the content distribution services available via a content server.

In step 402, a content distribution server (e.g., the content management server 300 of FIG. 3) may receive data relating to a user's interactions with other services or server systems (e.g., the secondary service server 120). In this regard, the user interaction data may comprise information relating to content that users sample during interactions with other services or systems. In step 404, the received user interaction related data may be processed and/or analyzed, such as to identify any content used or accessed by the user during the interactions with other services or systems. In step 406, the content distribution server may identify, based on the analysis of the user's interaction related data, any corresponding content offered or available for download (free or for-pay). In this regard, the identified content (if any) may comprise content that sufficiently match sampled content—e.g., either an exact match, or a sufficient match based on an applicable threshold or criteria (e.g., content from similar/same category, by the same artist/author, etc.). In step 408, the content distribution server may generate (or update if already existing) user preference information based on the analysis of the user's interaction related data. For example, in instances where a user database entry 342 may already exist, the newly obtained user interaction related data may be used to modify and/or adjust the existing entry (if feasible or permitted). Otherwise, a new user database entry 342 may be spawned and populated using the obtained interaction related data. In step 410, the content distribution server may generate an enhanced content recommendation—e.g., based on identified recommended content (or a category thereof), such as based on content matching and/or user preferences.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for detecting and utilizing user content preferences and use history provide high quality recommendations.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
   obtaining by a first server system that manages distribution of a first content and provides a first service, interactions related data relating to interactions of a user when obtaining second services from a second server system that manages distribution of content, wherein the second services comprise different services from the first service;
   identifying a second content that is provided by the second server system and is associated with the interactions for the second services;
   determining that the different services comprise restricting storage of the second content on electronic devices;
   mapping the second content to the first content;
   generating by the first server system, recommendation information personalized for the user based on the mapping of the second content to the first content; and
   applying an anonymous identifier to the interactions related data;
   wherein the second content comprises content that is a sample of the first content and restricted from storage on an electronic device associated with the user.

2. The method of claim 1, wherein the interactions of the user comprise viewing, sampling, and/or searching for at least a portion of the first content.

3. The method of claim 1, comprising mapping the second content to the first content based on matching of the second content or a category corresponding to the second content with the first content or a category corresponding to the first content.

4. The method of claim 3, comprising matching of the second content or a category corresponding to the second content with the first content or a category corresponding to the first content based on one or more matching thresholds.

5. The method of claim 1, comprising mapping the second content to the first content based on correlating attributes associated with the second content or a category corresponding to the second content to attributes associated with the first content or a category corresponding to the first content.

6. The method of claim 1, comprising mapping the second content to the first content based on one or more of: title parsing, metadata matching, or content fingerprinting.

7. The method of claim 1, comprising maintaining by the first server system a user database corresponding to a plurality of users associated with the first server system and/or services offered through the first server system.

8. The method of claim 7, comprising updating the user database based on the interactions related data.

9. The method of claim 8, comprising generating an entry in the user database corresponding to the user accessing the second content responsive to determining, during the updating of the user database, that it lacks an entry for the user.

10. The method of claim 8, comprising modifying or adjusting an entry in the user database corresponding to the user accessing the second content responsive to determining, during the updating of the user database, that it comprises an entry for the user.

11. The method of claim 1, further comprising:
removing an identifying data from the interactions related data, the identifying data comprising at least one of a user name and a publically available identifying data associated with the user;
updating, based on the interactions related data, a content preference information associated with a user entry of the user in a user database maintained by the first server system; and
wherein the second content comprises content that is a sample of the first content and restricted from storage on an electronic device associated with the user.

12. A system, comprising:
a first server system that manages distribution of a first content and provides a first service, the first server system being operable to:
obtain interactions related data relating to interactions of a user when obtaining second services from a second server system that manages distribution of content, wherein the second services comprise different services from the first service;
identify a second content that is provided by the second server system and is associated with the interactions for the second services;
determine that the different services comprise restricting storage of the second content on electronic devices;
map the second content to the first content;
generate by the first server system, recommendation information personalized for the user based on the mapping of the second content to the first content; and
apply an anonymous identifier to the interactions related data,
wherein the second content comprises content that is a sample of the first content and restricted from storage on an electronic device associated with the user.

13. The system of claim 12, wherein the interactions of the user comprise viewing, sampling, and/or searching for at least a portion of the first content.

14. The system of claim 12, wherein the first server system is operable to map the second content to the first content based on matching of the second content or a category corresponding to the second content with the first content or a category corresponding to the first content.

15. The system of claim 14, wherein the first server system is operable to match the second content or a category corresponding to the second content with the first content or a category corresponding to the first content based on one or more matching thresholds.

16. The system of claim 12, wherein the first server system is operable to map the second content to the first content based on correlating attributes associated with the second content or a category corresponding to the second content to attributes associated with the first content or a category corresponding to the first content.

17. The system of claim 12, wherein the first server system is operable to map the second content to the first content based on one or more of: title parsing, metadata matching, or content fingerprinting.

18. The system of claim 12, wherein the first server system is operable to maintain by the first server system a user database corresponding to a plurality of users associated with the first server system and/or services offered through the first server system.

19. The system of claim 18, wherein the first server system is operable to update the user database based on the interactions related data.

20. The system of claim 19, wherein the first server system is operable to generate an entry in the user database corresponding to the user accessing the second content responsive to determining, during the updating of the user database, that it lacks an entry for the user.

21. The system of claim 19, wherein the first server system is operable to modify or adjust an entry in the user database corresponding to the user accessing the second content responsive to determining, during the updating of the user database, that it comprises an entry for the user.

* * * * *